(12) United States Patent
Kono et al.

(10) Patent No.: US 7,960,926 B2
(45) Date of Patent: Jun. 14, 2011

(54) CONTROLLER FOR AC ROTARY MACHINE

(75) Inventors: Masaki Kono, Tokyo (JP); Keita Hatanaka, Tokyo (JP); Hideto Negoro, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 321 days.

(21) Appl. No.: 12/304,405

(22) PCT Filed: Nov. 29, 2006

(86) PCT No.: PCT/JP2006/323806
§ 371 (c)(1),
(2), (4) Date: Dec. 11, 2008

(87) PCT Pub. No.: WO2008/065719
PCT Pub. Date: Jun. 5, 2008

(65) Prior Publication Data
US 2009/0251082 A1    Oct. 8, 2009

(51) Int. Cl.
*H02P 21/00* (2006.01)
(52) U.S. Cl. ............... 318/400.02; 318/400.01; 318/700; 318/767; 318/798; 318/799
(58) Field of Classification Search ............. 318/400.02, 318/400.01, 700, 767, 798, 799
See application file for complete search history.

(56) References Cited

U.S. PATENT DOCUMENTS

| | | | |
|---|---|---|---|
| 5,136,228 A * | 8/1992 | Yamada et al. ............... | 318/808 |
| 6,043,617 A * | 3/2000 | Matsumoto et al. ............. | 318/52 |
| 6,335,605 B1 * | 1/2002 | Negoro ......................... | 318/727 |

FOREIGN PATENT DOCUMENTS

| JP | 8-66099 A | 3/1996 |
|---|---|---|
| JP | 8-80098 A | 3/1996 |
| JP | 10-201299 A | 7/1998 |
| JP | 2001-238497 A | 8/2001 |
| JP | 2002-142499 A | 5/2002 |
| JP | 2002-272197 A | 9/2002 |
| JP | 2003-302413 A | 10/2003 |
| JP | 2005-210813 A | 8/2005 |

OTHER PUBLICATIONS

International Search Report (PCT/ISA/210), Mar. 6, 2007.

\* cited by examiner

*Primary Examiner* — Walter Benson
*Assistant Examiner* — David S Luo
(74) *Attorney, Agent, or Firm* — Buchanan Ingersoll & Rooney PC

(57) ABSTRACT

A controller for an AC rotary machine, by which a stable rotation angular-frequency estimate (AFE) value can be obtained even in an extremely low speed region of the AC rotary machine is disclosed, and consequently stable control can be performed. The controller includes an AFE outputter that outputs an AFE value based on an angular-frequency calculated value including a rotation AFE value. The AFE outputter includes a lower-limit constant-value (LLCV) outputter that outputs a LLCV, a comparator that compares the angular-frequency calculated value to the LLCV, and a switcher that performs a switching operation according to the comparator. The switcher outputs the angular-frequency calculation value as the AFE value when the angular-frequency calculation value is larger than the LLCV, and outputs the LLCV as the AFE value when the angular-frequency calculation value is equal to or less than the LLCV.

4 Claims, 4 Drawing Sheets

US 7,960,926 B2

CONTROLLER FOR AC ROTARY MACHINE

TECHNICAL FIELD

The present invention relates to a controller for an AC rotary machine, and particularly relates to a controller for an AC rotary machine, which is a type of speed-sensorless vector control controller, and does not require a speed sensor mounted on the AC rotary machine.

BACKGROUND ART

In speed sensorless vector control, an AC output voltage outputted from a power converter to the AC rotary machine has an extremely low voltage value in an extremely low speed region in which speed of an AC rotary machine is extremely low. Moreover, the speed sensorless vector control may induce a setting error in rotary machine constant of an AC rotary machine to be used, an error in voltage value of the AC output voltage caused by a short-circuit prevention period between upper and lower arms including semiconductor elements configuring the power converter, and an error in voltage value of the AC output voltage caused by on-voltage drop of each of the semiconductor elements configuring the power converter. Therefore, the voltage value error in AC output voltage becomes extremely influential in the extremely low speed region in which the AC output voltage has an extremely low voltage value. On the other hand, in the speed sensor less vector control, an angular-frequency estimate value being an estimate value of angular frequency of the AC output voltage is calculated assuming that the AC output voltage corresponds to a voltage instruction value, and therefore when the voltage value error increases due to the above factors, an error in angular-frequency estimate output of the AC output voltage also increases, leading to instability in control. Therefore, the speed sensorless vector control has a problem that the angular-frequency estimate output of the AC output voltage should be stably calculated even in the extremely low speed region.

To meet the problem, according to the following patent document 1, first estimate means is provided, which generates an angular-frequency estimate value of an AC output voltage outputted from a power converter to an AC rotary machine based on a q-axis current instruction value Iq* and a q-axis current detected value Iq, and second estimate means is provided, which generates an angular-frequency estimate value of an AC output voltage based on the q-axis current instruction value Iq* and a d-axis current instruction value Id*, and when the angular-frequency estimate value of the AC voltage given by the first estimate means is equal to or less than a predetermined value, the first estimate means is switched to the second estimate means, and then control is continued. The second estimate means of the patent document 1 obtains an acceleration instruction value by a product of the d-axis current instruction value Id* and the q-axis current instruction value Iq*, and integrates the acceleration instruction value with an angular-frequency estimate value just before switching as an initial value, thereby obtains the relevant angular-frequency estimate value. In the patent document 2, monitor means is provided, which compares an angular-frequency estimate value being output from an angular-frequency estimate section to a preset lower-level set value, and performs switching by using switch means such that when the angular-frequency estimate value becomes equal to or less than a lower-limit level set value, set angular frequency as an output signal from function generation means is used in place of the angular-frequency estimate value.

Patent document 1: JP 2001-238497A, particularly paragraph 0005 thereof
Patent document 2: JP 8-80098A, particularly abstract thereof

DISCLOSURE OF THE INVENTION

Problems that the Invention is to Solve

However, according to the patent document 1, when speed of the AC rotary machine increases in some degree, the second estimate means needs to be switched to the first estimate means. However, in such a case, angular-frequency estimate output of the first estimate means does not always correspond to that of the second estimate means. Therefore, it is difficult to determine switching timing from the second estimate means to the first estimate means, and consequently a complicated algorithm is required. Moreover, the second estimate means generates the angular-frequency estimate value based on the q-axis current instruction value Iq* and the d-axis current instruction value Id*, therefore the means may highly stably calculate the angular-frequency estimate value. However, the second estimate means cannot follow turbulence such as voltage variation at a DC side of the power converter, and idling that may occur in an electric rolling stock. Since the second estimate means is weak in variation in voltage or speed, when the means is used, stability and reliability of the controller may be reduced.

According to the patent document 2, when a value of angular-frequency estimate output becomes equal to or less than a lower-limit level set-value, output of function generation means is set in place of the angular-frequency estimate output. However, setting of the function generation means is difficult. In addition, when an AC rotary machine is changed, setting of the function generation means needs to be changed, therefore the function generation means needs to be adjusted taking much time whenever the AC rotary machine is changed.

The invention proposes a controller for an AC rotary machine, which may solve the problems in the patent documents 1 and 2.

Means for Solving the Problems

A controller for an AC rotary machine according to the invention includes a controller that controls an AC rotary machine, the controller comprises a power converter that generates a three-phase AC output voltage being able to be varied in voltage and frequency so as to be corresponding to a three-phase voltage instruction value, and supplies the three-phase AC output voltage to the AC rotary machine; current detection means that detects a three-phase current of the AC rotary machine; angular-frequency estimate output means that outputs an angular-frequency estimate value being an estimate value of angular frequency of the three-phase AC output voltage; voltage instruction calculation means that calculates a voltage instruction value based on a current instruction value and the angular-frequency estimate value in a rotating biaxial coordinate system; phase calculation means that calculates a phase θ in the rotating biaxial coordinate system from the angular-frequency estimate value; dq-axis/three-phase conversion means that converts the voltage instruction value in the rotating biaxial coordinate system into the three-phase voltage instruction value based on the phase; three-phase/dq-axis conversion means that converts the three-phase current detected by the current detection means into a current detected value in the rotating biaxial coordinate system based on the phase; and rotation angular-frequency estimate calculation means that calculates a rotation angular-frequency estimate value being an estimate value of rotation angular frequency of the AC rotary machine based on the voltage instruction value, the current detected value, and the angular-frequency estimate value in the rotating biaxial coordinate system, wherein the angular-frequency estimate output means includes lower-limit constant value output means that outputs a lower-limit constant value, comparison means that compares an angular-frequency calculated value calculated based on the rotation angular-frequency estimate value to the lower-limit constant value, and switching means that performs switching to the angular-frequency calculated value or the lower-limit constant value, whichever is larger, according to a result of comparison by the comparison means, and outputs the larger value as the angular-frequency estimate value.

ADVANTAGE OF THE INVENTION

The controller for an AC rotary machine according to the invention has such an advantage that since the angular-frequency estimate value is equal to or more than the lower-limit constant value, the controller may stably control the AC rotary machine even in an extremely low speed region.

An object, a feature, a viewpoint and an advantage of the invention will be further clarified from the following detailed description of the invention with reference to drawings.

BEST MODE FOR CARRYING OUT THE INVENTION

Hereinafter, embodiments of a controller for an AC rotary machine according to the invention are described using drawings.

Embodiment 1

Figure 1:
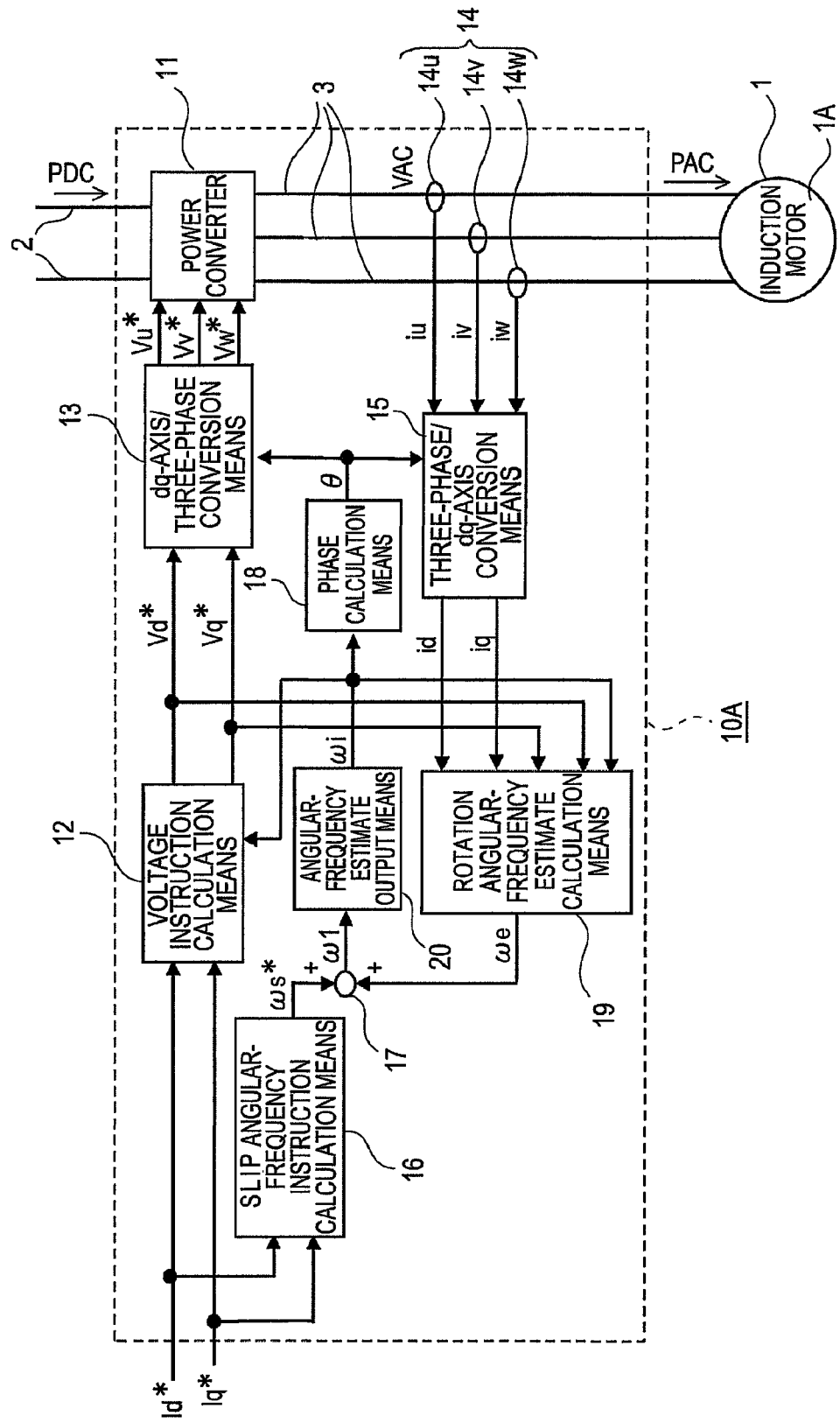
[FIG. 1] It is a block diagram showing embodiment 1 of a controller for an AC rotary machine according to the invention.

First, embodiment 1 of the controller for the AC rotary machine according to the invention is described with reference to FIG. 1. The controller for the AC rotary machine of the embodiment 1 shown in FIG. 1 includes a controller 10A that controls an AC rotary machine 1. The AC rotary machine 1 specifically is an induction motor 1A which is mounted in an electric car or the like to drive the electric car or the like. The controller 10A is also mounted in the electric car together with the induction motor 1A to control the induction motor 1A.

The controller 10A includes a power converter 11, voltage instruction calculation means 12, dq-axis/three-phase conversion means 13, current detection means 14, three-phase/dq-axis conversion means 15, slip angular-frequency instruction calculation means 16, addition means 17, angular-frequency estimate output means 20, phase calculation means 18, and rotation angular-frequency estimate calculation means 19.

The power converter 11 is a known VVVF-type power converter, and the power converter 11 converts DC power PDC from a DC line 2 into three-phase AC output power PAC being variable in voltage and frequency, and supplies the three-phase AC output power PAC to the induction motor 1A through a three-phase feeder 3. The DC line 2 is connected to a DC feeder disposed along a travelling rail for the electric car through a current collecting shoe of the electric car. The power converter 11 is configured in such a way that respective AC switch electric lines of a U-phase, a V-phase and a W-phase between a pair of electric lines connected to the DC line 2, and each of the AC switch electric lines is connected with upper and lower arms including semiconductor elements, and each AC switch electric line is connected with the three-phase feeder 3. The power converter 11 controls a phase in which each semiconductor element on each AC switch electric line by using three phase voltage instruction values Vu*, Vv* and Vw*, so that the DC power PDC is converted into the three-phase AC output power PAC. A three-phase AC voltage of the three-phase AC output power PAC is referred to as three-phase AC output voltage VAC. The three-phase AC output voltage VAC is a three-phase AC voltage being variable in voltage and frequency.

The voltage instruction calculation means 12 calculates a d-axis voltage instruction value Vd* and a q-axis voltage instruction value Vq* in a rotating biaxial coordinate system based on a d-axis current instruction value Id*, a q-axis current instruction value Iq*, and an angular-frequency estimate value $\omega i$ in the rotating biaxial coordinate system, and supplies the d-axis voltage instruction value Vd* and the q-axis voltage instruction value Vq* to the dq-axis/three-phase conversion means 13. The d-axis current instruction value Id* and the q-axis current instruction value Iq* are supplied from the outside of the controller 10A to the voltage instruction calculation means 12. The angular-frequency estimate value $\omega i$ is supplied from the angular-frequency estimate output means 20 to the voltage instruction calculation means 12. The dq-axis/three-phase conversion means 13 generates the three phase voltage instruction values Vu*, Vv* and Vw* based on the d-axis voltage instruction value Vd* and the q-axis voltage instruction value Vq*, and supplies the three phase voltage instruction values Vu*, Vv* and Vw* to the power converter 11.

The d-axis current instruction value Id* is expressed by the following formula (1).

$$Id^* = \phi^*/M \qquad (1)$$

$\phi^*$ shows a secondary magnetic-flux instruction value for the induction motor 1A, and M shows mutual inductance being a motor constant of the induction motor 1A.

The q-axis current instruction value Iq* is expressed by the following formula (2).

$$Iq^* = \tau^*/\phi^* \times Lr/M/p \qquad (2)$$

$\tau^*$ shows a torque instruction value for the induction motor 1A, Lr shows secondary inductance being a motor constant of the induction motor 1A, and p shows a number of polar pairs of the induction motor 1A.

The d-axis voltage instruction value Vd* is expressed by the following formula (3), and the q-axis voltage instruction value Vq* is expressed by the following formula (4). The voltage instruction calculation means 12 calculates the d-axis voltage instruction value Vd* and the q-axis voltage instruction value Vq* according to the formulas (3) and (4).

$$Vd^* = Rs \times Id^* - \omega i \times \sigma \times Ls \times Iq^* \quad (3)$$

$$Vq^* = Rs \times Iq^* + \omega i \times Ls \times Id^* \quad (4)$$

Rs shows primary resistance being a motor constant of the induction motor 1A, and Ls shows primary inductance being a motor constant of the induction motor 1A. σ is a constant calculated from the motor constants of the induction motor 1A, and expressed by the following formula (5).

$$\sigma = 1 - (M^2/Lr/Ls) \quad (5)$$

The current detection means 14 has current detectors 14u, 14v and 14w provided in respective phases of the three-phase feeder 3, and the current detectors 14u, 14v and 14w detect three-phase current detected values iu, iv and iw of the U-phase, V-phase and W-phase of the induction motor 1A, and supplies the current detected values to the three-phase/dq-axis conversion means 15. The three-phase/dq-axis conversion means 15 converts the three-phase current detected values iu, iv and iw into the d-axis current detected value id and the q-axis current detected value iq in the rotating biaxial coordinate system.

For example, a current transformer (CT) is used for each of the current detectors 14u, 14v and 14w of the current detection means 14, and the current transformer detects the three-phase current detected values iu, iv and iw flowing through the AC feeder 3. However, the current detection means 14 may be configured such that it detects a three-phase current flowing through an AC circuit having the U-phase, V-phase and W-phase in the inside of the power converter 11 by using other known means. Moreover, since a relationship of iu+iv+iw=0 is established, for example, a current detected value iw of the W-phase can be obtained from current detected values iu and iv of two phases of the U and V phases.

The slip angular-frequency instruction calculation means 16 calculates a slip angular-frequency instruction value ωs* based on the d-axis current instruction value Id* and the q-axis current instruction value Iq* in the rotating biaxial coordinate system. The slip angular-frequency instruction value ωs* is expressed by the following formula (6). The slip angular-frequency instruction calculation means 16 calculates the slip angular-frequency instruction value ωs* according to the formula (6).

$$\omega s^* = (Iq^* \times Rr)/(Id^* \times Lr) \quad (6)$$

Rr shows secondary resistance being a motor constant of the induction motor 1A.

The addition means 17 outputs an angular-frequency calculated value ω1 given by adding the slip angular-frequency instruction value ωs* from the slip angular-frequency instruction calculation means 16 and a rotation angular-frequency estimate value ωe from the rotation angular-frequency estimate calculation means 19, and supplies the angular-frequency calculated value ω1 to the angular-frequency estimate output means 20. The angular-frequency calculated value ω1 is expressed by the following formula (7).

$$\omega 1 = \omega s^* + \omega e \quad (7)$$

The angular-frequency estimate output means 20 is inputted with the angular-frequency calculated value ω1 from the addition means 17, and outputs an angular-frequency estimate value ωi in the rotating biaxial coordinate system. The angular-frequency estimate value ωi shows angular frequency of the three-phase AC output voltage VAC outputted from the power converter 11. The angular-frequency estimate value ωi is supplied to each of the voltage instruction calculation means 12, the phase calculation means 18, and the rotation angular-frequency estimate calculation means 19.

The phase calculation means 18 calculates a phase θ in the rotating biaxial coordinate system based on the angular-frequency estimate value ωi, and supplies the phase θ to each of the dq-axis/three-phase conversion means 13 and the three-phase/dq-axis conversion means 15. The phase θ corresponds to a value given by integrating the angular-frequency estimate value ωi by the phase calculation means 18. The rotation angular-frequency estimate calculation means 19 is supplied with the d-axis voltage instruction value Vd* and the q-axis voltage instruction value Vq* from the voltage instruction calculation means 12, the d-axis current detected value id and the q-axis current detected value iq from the three-phase/dq-axis conversion means 15, and the angular-frequency estimate value ωi from the angular-frequency estimate output means 20.

The rotation angular-frequency estimate calculation means 19 calculates the rotation angular-frequency estimate value ωe showing rotation angular-frequency of the induction motor 1A in the rotating biaxial coordinate system based on the d-axis voltage instruction value Vd* and the q-axis voltage instruction value Vq*, and the d-axis current detected value id, the q-axis current detected value iq and the angular-frequency estimate value ωi, and supplies the rotation angular-frequency estimate value ωe to the addition means 17. A detailed way of calculating the rotation angular-frequency estimate value ωe by the rotation angular-frequency estimate calculation means 19 is disclosed in JP 2003-302413A or the like. That is, since the detailed way is regarded as an existent technique, it is omitted to be described.

As a feature of the invention, the angular-frequency estimate output means 20 outputs the angular-frequency estimate value ωi such that the value ωi is equal to or more than a lower-limit constant value ω2. Thus, the angular-frequency estimate output means 20 is described in detail with reference to FIG. 2.

Figure 2:
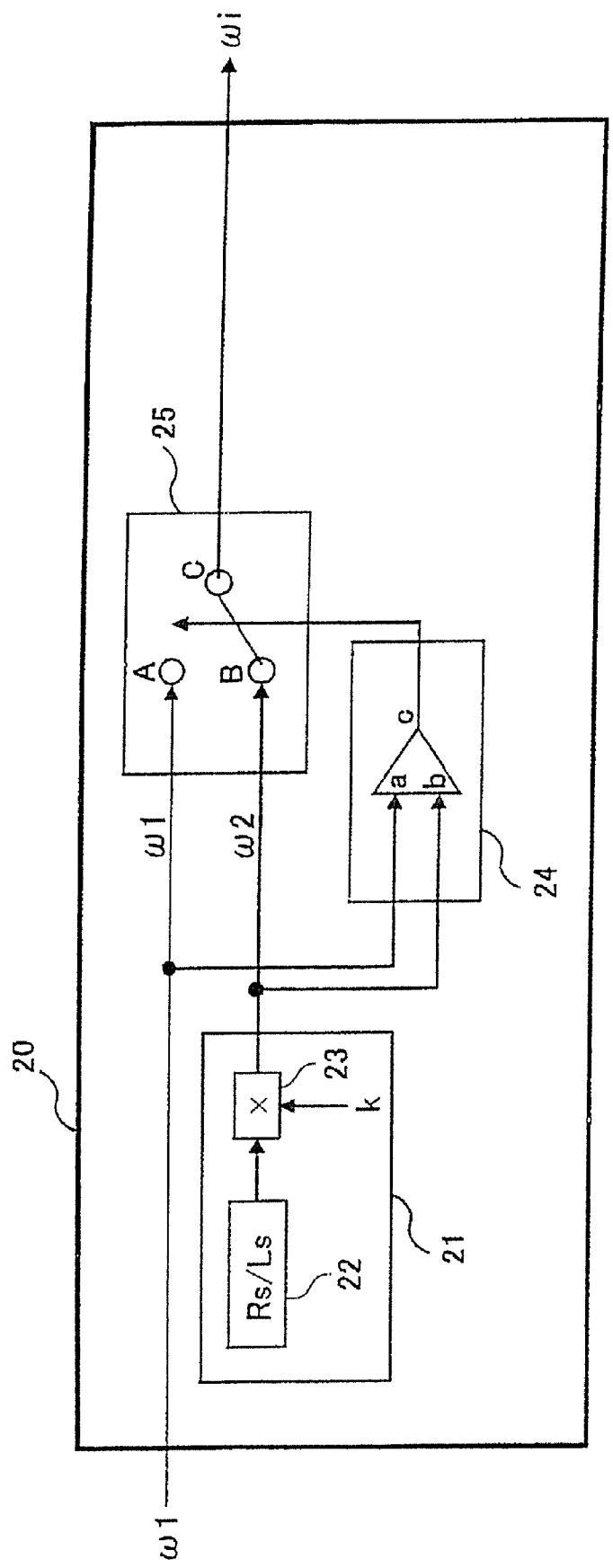
[FIG. 2] It is a block diagram showing detail of angular-frequency estimate output means in the embodiment 1.

As shown in FIG. 2, the angular-frequency estimate output means 20 has a lower-limit constant value output means 21, a comparison means 24, and a switching means 25. The lower-limit constant value output means 21 includes a constant setting means 22 and multiplication means 23. The constant setting means 22 uses Rs and Ls, being motor constants of the induction motor 1A respectively, to set a constant value Rs/Ls, and supplies the constant value Rs/Ls to the multiplication means 23. The multiplication means 23 further multiplies the constant value Rs/Ls by a multiplication constant k, and outputs a lower-limit constant value ω2. The multiplication constant k is a positive constant obtained as described later. The lower-limit constant value ω2 is expressed by the following formula (8). The lower-limit constant value ω2 is outputted from the lower-limit constant value output means 21.

$$\omega 2 = k \times Rs/Ls \quad (8)$$

The comparison means 24 has first input a, second input b, and output c. The first input a of the comparison means 24 is supplied with the angular-frequency calculated value ω1 from the addition means 17. The angular-frequency calculated value ω1 is outputted as addition of the slip angular-frequency instruction value ωs* and the rotation angular-frequency estimate value ωe as shown in the formula (7). The second input b of the comparison means 24 is inputted with the lower-limit constant value ω2 from the lower-limit constant value output means 21. The output c of the comparison means 24 is supplied to the switching means 25 to perform switching control of the switching means 25. The switching means 25 has first input A, second input B, and output C. The first input A of the switching means 25 is supplied with the angular-frequency calculated value ω1 from the addition means 17. The second input B of the switching means 25 is inputted with the lower-limit constant value ω2 from the lower-limit constant value output means 21. The output C of the switching means 25 outputs the angular-frequency estimate value ωi.

According to the output c of the comparison means 24 that compares the angular-frequency calculated value ω1 to the lower-limit constant value ω2, the switching means 25 switches between a first state where the input A is connected to the output C so that the angular-frequency estimate value ωi from the output C is equal to the angular-frequency calculated value ω1, and a second state where the input B is connected to the output C so that the angular-frequency estimate value ωi from the output C is equal to the lower-limit constant value ω2. When the output c has a value showing a relationship of ω1>ω2, the comparison means 24 controls the switching means 25 into the first state. In the first state, ωi=ω1 is established, and thus the angular-frequency calculated value ω1 is outputted from the angular-frequency estimate output means 20 as the angular-frequency estimate value ωi. When rotation speed of the induction motor 1A is reduced, so that the angular-frequency calculated value ω1 is equal to or less than the lower-limit constant value χ2, and the output c has a value showing ω1≦ω2, the comparison means 24 controls the switching means 25 into the second state. In the second state, ωi=ω2 is established, and thus the lower-limit constant value ω2 is outputted from the angular-frequency estimate output means 20 as the angular-frequency estimate value ωi. Generally, the angular-frequency estimate value ωi is limited to be equal to or more than the lower-limit constant value ω2 in an extremely low speed region of the induction motor 1A in which the rotation angular-frequency estimate value ωe of the induction motor 1A is inaccurate. In other speed regions, since the rotation angular-frequency estimate value ωe is accurate, the angular-frequency estimate value ωi is equal to the angular-frequency calculated value ω1 given by adding the rotation angular-frequency estimate value ωe to the slip angular-frequency instruction value ωs*.

Since the rotation angular-frequency estimate value ωe given by the rotation angular-frequency estimate calculation means 19 is inaccurate in the extremely low speed region of the induction motor 1A, if the rotation angular-frequency estimate value ωe is directly used, control of the induction motor 1A becomes unstable. However, in the embodiment 1, the lower-limit constant value output means 21 limits the angular-frequency estimate value ωi to be equal to or more than the lower-limit constant value ω2 in the extremely low speed region of the induction motor 1A in which the rotation angular-frequency estimate value ωe is inaccurate, so that control is stabilized.

The multiplication constant k is determined as follows. In a no-loaded condition where actual torque of the induction motor 1A is zero, that is, the q-axis current instruction value Iq* shows Iq*=0, calculation of the rotation angular-frequency estimate value ωe in the extremely low speed region of the induction motor 1A is supposed to be most difficult. In this case, Iq*=0 is substituted for the formulas (3) and (4), and thus the d-axis voltage instruction value Vd* and the q-axis voltage instruction value Vq* are expressed by the following formulas (9) and (10) respectively.

$$Vd^* = Rs \times Id^* \quad (9)$$

$$Vq^* = \omega i \times Ls \times Id^* \quad (10)$$

To stably calculate the rotation angular-frequency estimate value ωe, magnitude of the q-axis voltage instruction value Vq* (absolute value) needs to be equal to or larger than magnitude of the d-axis voltage instruction value Vd* (absolute value), that is, |Vd*|≦|Vq*| needs to be established. Here, |Vd*|≦|Vq*| is substituted with the formulas (9) and (10), and then modified. Thus, the following formula is given.

$$Rs \times |Id^*| \leq \omega i \times Ls \times |Id^*|$$

$$Rs \leq \omega i \times Ls$$

$$\omega i \geq Rs/Ls \quad (11)$$

The formula (11) shows that the angular-frequency estimate value ωi needs to be equal to or more than the lower limit value in order to stably calculate the rotation angular-frequency estimate value ωe. While a right side of the formula (11) has to be equal to the lower-limit constant value ω2, when a right side of the formula (8) for calculating the lower-limit constant value ω2 is compared to a right side of the formula (11), the formula (8) is different from the formula (11) in that it includes the multiplication constant k.

The multiplication constant k is introduced to stably calculate the rotation angular-frequency estimate value ωe after consideration that a primary resistance value Rs is changed depending on temperature. The formula (11) needs to be established for all primary resistance values Rs in a supposed temperature range, and when a maximum value of the primary resistance values Rs in the supposed temperature range is assumed as Rsmax, the formula (11) is modified as follows.

$$\omega i \geq Rsmax/Ls = \omega 2 \quad (12)$$

The primary resistance value Rs in the formula (8) strictly means the primary resistance value Rss at the standard temperature, and when the formula (12) is substituted with the formula (8) and modified, the following formula is obtained for calculating the multiplication constant k.

$$Rsmax/Ls = k \times Rss/Ls$$

$$Rsmax = k \times Rss$$

$$k = Rsmax/Rss \quad (13)$$

The multiplication constant k is about 1.5 in an induction motor 1A having a typical size, and, for example, has a value of 1.25 in a small induction motor 1A. For example, when the induction motor 1A is assumed to be a 150 [kW] induction motor being mounted in an electric car, the primary resistance value Rss is 0.1173 [Ω], and the primary inductance is 0.037 [H] at the standard temperature, and when the lower-limit constant value ω2 is calculated using the formula (8) with the multiplication constant k being assumed as 1.5, 4.75 [rad/sec], that is, 0.756 [Hz] is given.

Figure 3:
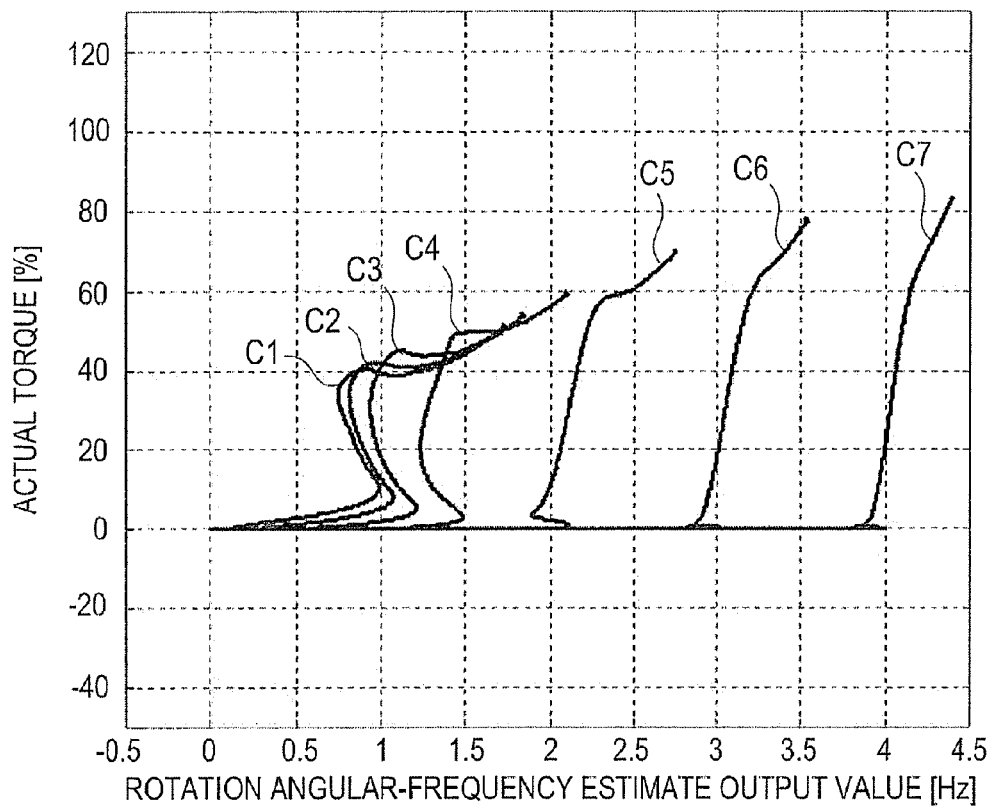
[FIG. 3] It is a characteristic diagram showing a relationship between a rotation angular-frequency estimate value and actual torque of the AC rotary machine in the embodiment 1.
Figure 4:
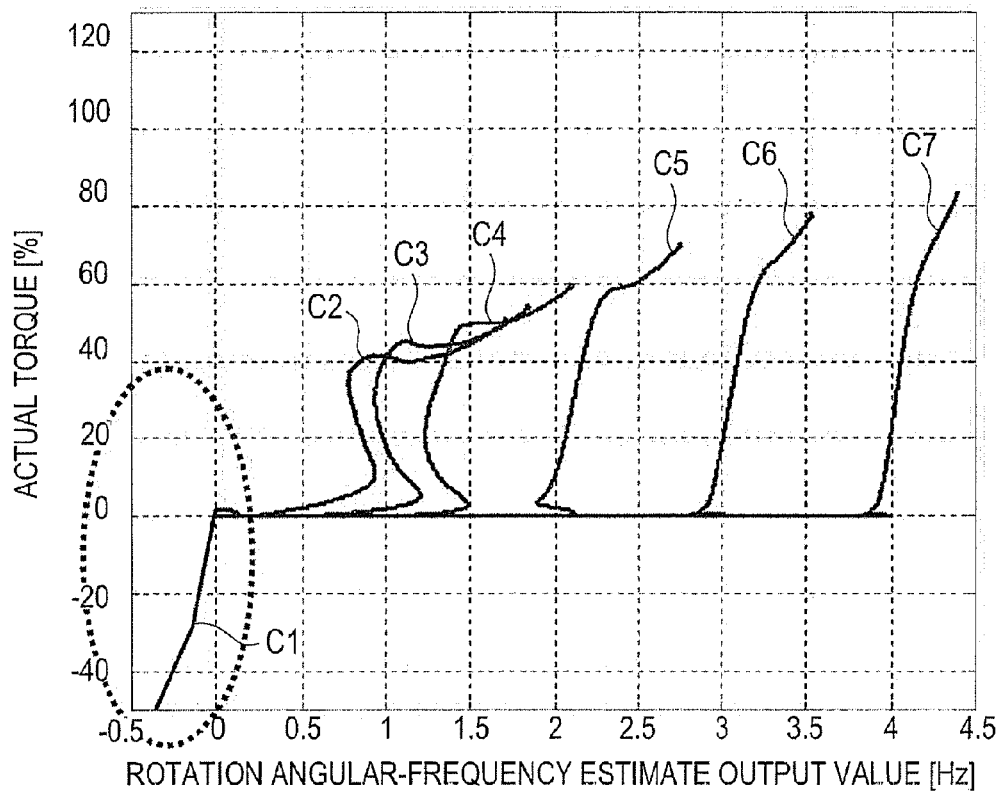
[FIG. 4] It is a characteristic diagram showing a relationship between a rotation angular-frequency estimate value and actual torque of the AC rotary machine in a prior device.

An advantage given by the lower-limit constant value output means 21 is described while comparing FIG. 3 with FIG. 4. FIGS. 3 and 4 show characteristic diagrams showing a relationship between the rotation angular-frequency estimate value ωe obtained by simulation and actual torque of the induction motor 1A in order to show an advantage that the rotation angular-frequency estimate value ωe is limited to be equal to or more than the lower-limit constant value ω2, thereby speed estimate can be stably performed. As a condition of the simulation, assuming that there is such a setting error that the primary resistance value is larger than an actual value among the rotary machine constants, rotation frequency of the induction motor 1A is virtually fixed at one of 0.1, 0.25, 0.5, 1.0, 2.0, 3.0 and 4.0 [Hz], and a torque instruction value is changed in a range of 0 to 100% of a maximum torque instruction value. The reason for fixing the rotation frequency of the induction motor 1A is to easily understand what degree of error occurs in speed estimate. The rotation frequency of the induction motor 1A depends on frequency of an AC voltage outputted by the power converter 11, and frequency of the three-phase voltage instruction value to the power converter 11 depends on the rotation angular-frequency estimate value ωe. Therefore, the rotation frequency of the induction motor 1A cannot be actually fixed to a value being significantly different from the rotation angular-frequency estimate value ωe.

In FIGS. 3 and 4, a horizontal axis shows a value [Hz] of the rotation angular-frequency estimate value ωe expressed in frequency, and a vertical axis shows actual torque [%] of the induction motor 1A. FIG. 3 shows a characteristic in the embodiment 1 in the case that the angular-frequency estimate output means 20 has the lower-limit constant value output means 21, the comparison means 24, and the switching means 25, and the angular-frequency estimate value ωi is limited to be equal to or more than the lower-limit constant value ω2 in the extremely low speed region of the induction motor 1A. On the other hand, FIG. 4 shows a characteristic in the case that the lower-limit constant value output means 21, the comparison means 24, and the switching means 25 in the embodiment 1 are eliminated, and the angular-frequency calculated value ω1 is directly outputted as the angular-frequency estimate value ωi. In FIGS. 3 and 4, characteristics C1 to C7 correspond to characteristics at rotation frequency of 0.1, 0.25, 0.5, 1.0, 2.0, 3.0 and 4.0 [Hz] of the induction motor 1A respectively.

From the characteristics shown in FIG. 4, it can be confirmed that the rotation angular-frequency estimate value ωe is unstable, and the rotation angular-frequency estimate value ωe and the actual torque drop to zero or less respectively in the extremely low speed region when the rotation frequency of the induction motor 1A is 0.1 [Hz]. This shows that a stable rotation angular-frequency estimate value ωe cannot be obtained in the extremely low speed region of the induction motor 1A, leading to instability in control. On the other hand, from the characteristics shown in FIG. 3, it is found that even if the rotation frequency of the induction motor 1A is 0.1 [Hz], the rotation angular-frequency estimate value ωe does not drop to zero or less, and thus a stable rotation angular-frequency estimate value ωe can be obtained, and consequently a stable torque characteristic can be secured. This shows that a stable rotation angular-frequency estimate value ωe can be obtained even in the extremely low speed region of the induction motor 1A, leading to stability in control.

In this way, according to the embodiment 1, stable output torque can be generated even in the extremely low speed region of the induction motor 1A, and thus a stable rotation angular-frequency estimate value ωe can be obtained even in the extremely low speed region of the induction motor 1A. Therefore, reliability of the controller for the induction motor 1A can be improved. In addition, the lower-limit constant value output means 21 outputs a lower-limit constant value as a constant based on the motor constants Rs and Ls, and the multiplication constant k, thereby the lower-limit constant value can be advantageously easily determined without particular adjustment.

Embodiment 2

Figure 5:
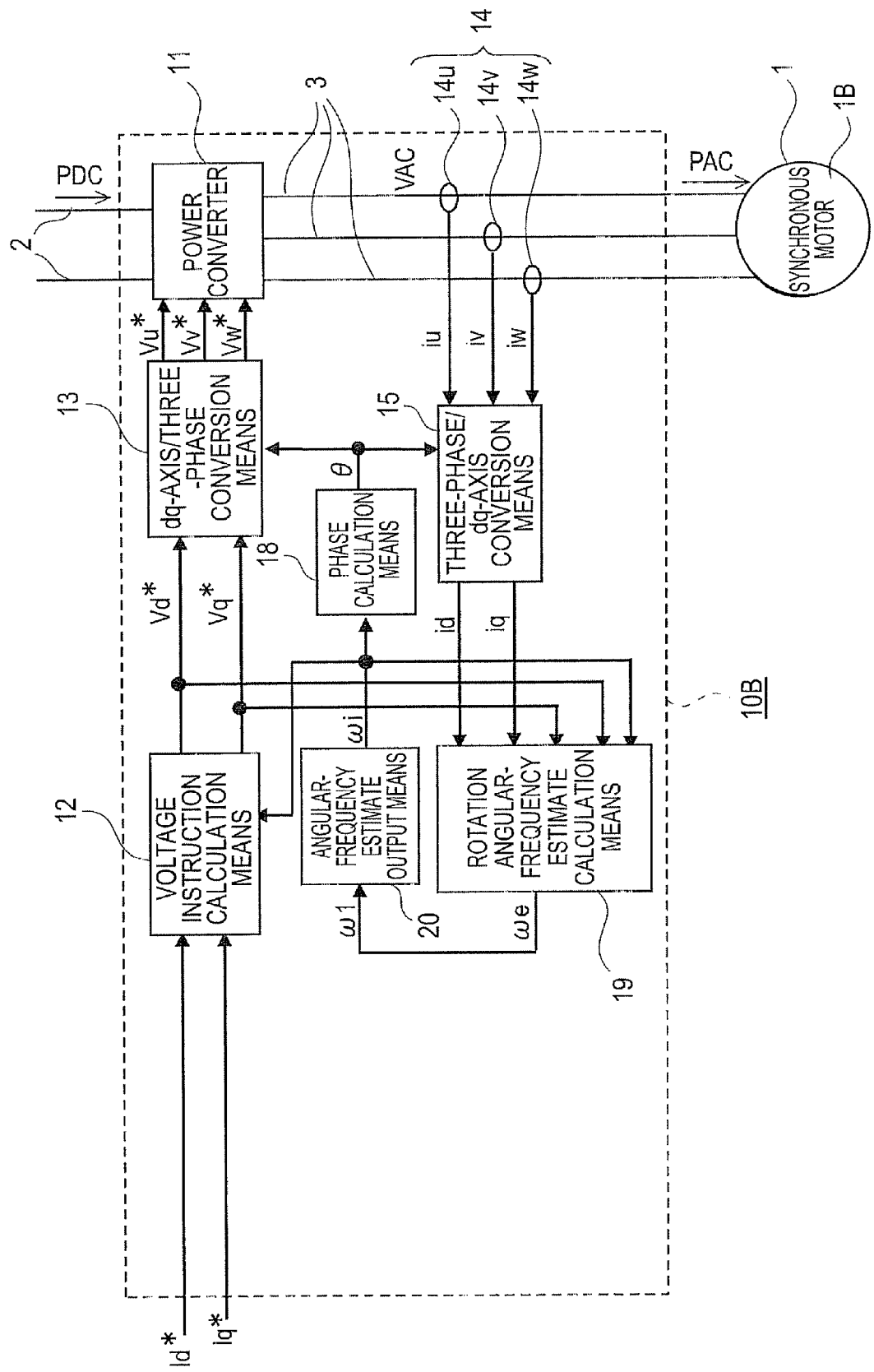
[FIG. 5] It is a block diagram showing embodiment 2 of a controller for an AC rotary machine according to the invention.

FIG. 5 shows a block circuit diagram showing embodiment 2 of the controller for the AC rotary machine according to the invention. In the embodiment 2, the AC rotary machine 1 is a synchronous motor 1B, and the controller 10A in the embodiment is replaced by a controller 10B. In the controller 10B shown in FIG. 5, the slip angular-frequency instruction calculation device 16 and the addition means 17 in the controller 10A are eliminated, and the rotation angular-frequency estimate value ωe from the rotation angular-frequency estimate calculation means 19 is directly supplied to the angular-frequency estimate output means 20 as the angular-frequency calculated value ω1. Except for this, the controller 10B is configured in the same way as the controller 10A.

In the embodiment 2, since the AC rotary machine 1 includes the synchronous motor 1B being not slippy, while the rotation angular-frequency estimate value ωe is directly supplied as the angular-frequency calculated value ω1, the same advantage as in the embodiment 1 can be obtained.

Various modifications or alterations of the invention can be performed by those skilled in the art without departing from the scope and sprit of the invention, and it should be understood that the embodiments described in the invention are not limitative.

INDUSTRIAL APPLICABILITY

The controller for an AC rotary machine according to the invention can be used for various AC rotary machines such as an AC rotary machine mounted in an electric rolling stock.

The invention claimed is:

1. A controller for an AC rotary machine, which controls an AC rotary machine, the controller comprising:
a power converter that generates a three-phase AC output voltage being able to be varied in voltage and frequency to be corresponding to a three-phase voltage instruction value, and supplies the three-phase AC output voltage to the AC rotary machine;
current detection means that detects a three-phase current of the AC rotary machine;
angular-frequency estimate output means that outputs an angular-frequency estimate value being an estimate value of angular frequency of the three-phase AC output voltage;
voltage instruction calculation means that calculates a voltage instruction value based on a current instruction value and the angular-frequency estimate value in a rotating biaxial coordinate system;
phase calculation means that calculates a phase θ in the rotating biaxial coordinate system from the angular-frequency estimate value;
dq-axis/three-phase conversion means that converts the voltage instruction value in the rotating biaxial coordinate system into the three-phase voltage instruction value based on the phase;
three-phase/dq-axis conversion means that converts the three-phase current detected by the current detection means into a current detected value in the rotating biaxial coordinate system based on the phase; and
rotation angular-frequency estimate calculation means that calculates a rotation angular-frequency estimate value being an estimate value of rotation angular frequency of the AC rotary machine based on the voltage instruction value, the current detected value, and the angular-frequency estimate value in the rotating biaxial coordinate system,
wherein the angular-frequency estimate output means includes lower-limit constant value output means that outputs a lower-limit constant value, comparison means that compares an angular-frequency calculated value calculated based on the rotation angular-frequency estimate value to the lower-limit constant value, and switching means that performs switching to the angular-frequency calculated value or the lower-limit constant value, whichever is larger, according to a result of comparison by the comparison means, and outputs the larger value as the angular-frequency estimate value, and when it is assumed that primary resistance of the AC rotary machine is Rs and primary inductance of the AC rotary machine is Ls, the lower-limit constant value is set to be equal to the value Rs/Ls or more.

2. The controller for an AC rotary machine according to claim 1, wherein when it is assumed that a value given by dividing a maximum value of the primary resistance by a value of the primary resistance at the standard temperature is k, the lower-limit constant value $\omega 2$ is calculated according to $\omega 2 = k \times Rs/Ls$.

3. The controller for an AC rotary machine according to claim 1, wherein the AC rotary machine is an induction motor, the controller further includes slip angular-frequency instruction calculation means that calculates a slip angular-frequency instruction value of the induction motor based on the current instruction value in the rotating biaxial coordinate system, and a value of adding the rotation angular-frequency estimate value and the slip angular-frequency instruction value is determined to be the angular-frequency calculated value.

4. The controller for an AC rotary machine according to claim 1, wherein the AC rotary machine is a synchronous motor, and the rotation angular-frequency estimate value is determined to be the angular-frequency calculated value.

* * * * *